(12) United States Patent
Hwang

(10) Patent No.: US 6,927,919 B2
(45) Date of Patent: Aug. 9, 2005

(54) COLLIMATING LENS, COLLIMATING SYSTEM, AND IMAGE DISPLAYING APPARATUS USING COLLIMATING SYSTEM

(75) Inventor: Ju-seong Hwang, Chungcheongnam-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 10/355,127

(22) Filed: Jan. 31, 2003

(65) Prior Publication Data

US 2003/0147151 A1 Aug. 7, 2003

(30) Foreign Application Priority Data

Feb. 1, 2002 (KR) ................................ 10-2002-0005877

(51) Int. Cl.$^7$ .............................................. G02B 27/30
(52) U.S. Cl. ........................ 359/641; 359/640; 359/649
(58) Field of Search ................................ 359/641, 558, 359/566, 569, 571, 575, 649–651, 618, 629, 634, 638, 640, 831, 837

(56) References Cited

U.S. PATENT DOCUMENTS

| 4,583,151 A | 4/1986 | Nagel | 362/29 |
|---|---|---|---|
| 4,815,807 A | * 3/1989 | Kaneko et al. | 385/33 |
| 4,904,068 A | 2/1990 | Tatsuno et al. | 359/559 |
| 5,058,981 A | * 10/1991 | Umegaki et al. | 359/328 |
| 5,537,171 A | 7/1996 | Ogino et al. | 353/122 |
| 6,094,286 A | * 7/2000 | Kato | 359/206 |
| 6,377,376 B1 | 4/2002 | Gfeller et al. | 398/135 |
| 6,583,934 B2 | * 6/2003 | Kramer | 359/569 |
| 2002/0003670 A1 | 1/2002 | Oliva | 359/668 |

FOREIGN PATENT DOCUMENTS

| DE | 100 08 337 | 9/2000 |
|---|---|---|
| EP | 509 679 | 10/1992 |
| JP | 9-61610 | 3/1997 |

OTHER PUBLICATIONS

TFDT4000 Integrated Transceiver, Jan. 7, 1996, pp. 1–9.

* cited by examiner

Primary Examiner—Jordan M Schwartz
(74) Attorney, Agent, or Firm—Staas & Halsey LLP

(57) ABSTRACT

A collimating lens and a collimating system which condense light emitted from a light source with directivity at a high efficiency and a projection type image displaying apparatus using the same. The collimating system includes a light source having at least one dominant emitting angle at which light having a relatively great intensity distribution is emitted and a collimating lens including at least one prism portion having an exit surface sloping at a prism angle corresponding to the dominant emitting angle.

22 Claims, 10 Drawing Sheets

COLLIMATING LENS, COLLIMATING SYSTEM, AND IMAGE DISPLAYING APPARATUS USING COLLIMATING SYSTEM

CROSS-REFERENCE TO RELATED APPLICATIONS

This application claims the priority of Korean Patent Application No. 2002-5877, filed Feb. 1, 2002, in the Korean Intellectual Property Office, the disclosure of which is incorporated herein in its entirety by reference.

BACKGROUND OF THE INVENTION

1. Field of the Invention

The present invention relates to a collimating lens and a collimating system, which condense relatively great intensity light emitted from a light source at an angle onto a projection optical system at a high efficiency, and a projection type image displaying apparatus using the collimating system.

2. Description of the Related Art

FIG. 1 shows a conventional light emitting diode (LED) having a chip 100 as a light emitter, a die 103 which supports the chip 100 and has a reflecting surface 103a that reflects and converges widely diverging light from the light source, and a dome 105 which further condenses the light reflected from the reflecting surface 103a.

The die 103 and the dome 105 constitute a primary optical system of a projection type image displaying apparatus, which improves the light efficiency by concentrating light in an entrance pupil of a projection type optical system (not shown). However, since light is emitted from the chip 100 at a great divergence angle, the light cannot be entirely concentrated in the projection type optical system, although it is converged by the primary optical system.

LEDs include absorbing substrate (AS) type LEDs, transparent substrate (TS) type LEDs, high-power LEDs, and truncated inverted pyramid (TIP) type LEDs. Among these LEDs, TIP type LEDs are frequently used as a light source for projection type image displaying apparatuses, due to their high light efficiency.

FIG. 2 shows a light intensity distribution with respect to emitting angle variations in a TIP type LED. As shown in FIG. 2, the TIP type LED has an upper emitting angle limit of about 120° and emits peak intensity light at angles of about ±38°. In FIG. 2, the solid line indicates a typical upper bound of the light intensity, and the dashed line indicates a typical lower bound of the light intensity. Since the range of emitting angles of the TIP type LED is too wide, high concentration efficiency cannot be achieved with only the primary optical system.

For this reason, as shown in FIG. 1, a secondary optical system 108 which further concentrates the light from the primary optical system is provided. Conventionally, collimating lenses, such as a biconvex lens as shown in FIG. 3A, a planoconcave lens as shown in FIG. 3B, a biconvex lens as shown in FIG. 3C, and a planoconcave lens as shown in FIG. 3D, have been used as the secondary optical system.

For example, when the biconvex lens is used as the secondary optical system, light is condensed as follows. Referring to FIG. 4A, where a light beam is collimated at a position P1, a light beam at a position P2 greatly diffracts towards the optical axis. In contrast, where a light beam is collimated at the position P2, as shown in FIG. 4B, a light beam at the position P1 slightly diffracts and diverges. As described above, light greatly diffracts at a boundary of a pupil of the biconvex lens 108 whereas light gently diffracts near a center of the pupil of the biconvex lens 108. Due to the difference in diffracting power within the bioconvex lens 108, such conventional collimating lens structures are unable to collimate and entirely concentrate the incident light in the pupil.

SUMMARY OF THE INVENTION

Accordingly, an aspect of the prevent invention is to provide a collimating lens and a collimating system that efficiently condense light emitted from a light source having a dominant emitting angle, at which a light intensity distribution is relatively greater than the light intensity distribution at other various emitting angles of the light source, and an image displaying apparatus using the collimating system.

Additional aspects and advantages of the invention will be set forth in part in the description which follows and, in part, will be obvious from the description, or may be learned by practice of the invention.

To achieve the above and/or other aspects of the present invention, there is provided a collimating lens collimating light emitted from a light source having at least one dominant emitting angle at which light having a relatively great intensity distribution is emitted, the collimating lens comprising at least one prism portion having an exit surface sloping at a prism angle corresponding to the dominant emitting angle of the light source.

To achieve the above and/or other aspects of the present invention, there is provided a collimating system comprising a light source having at least one dominant emitting angle at which light having a relatively great intensity distribution is emitted, and a collimating lens including at least one prism portion having an exit surface sloping at a prism angle corresponding to the dominant emitting angle.

The at least one prism portion may be designed to satisfy the following relationship:

$$\tan\alpha_n = \frac{\sin\Omega_n}{\sqrt{n^2 - \sin^2\Omega_n} - 1}$$

where $\alpha_n$ denotes the prism angle of the prism portion, $\Omega_n$ denotes the dominant emitting angle of the light source, and n is a refractive index of the collimating lens.

The at least one prism portion may be concentrically formed in the collimating lens.

The collimating lens may be a polygonal lens having a continuous exit surface. The light source may be a light emitting diode or a laser diode. The light source may have an array structure.

To achieve the above and/or other aspects of the present invention, there is also provided a collimating system comprising a light source having at least one dominant emitting angle at which light having a relatively great intensity distribution is emitted, and a diffracting optical element including at least one sectional region having a grating spacing corresponding to the dominant emitting angle.

To achieve the above and/or other aspects of the present invention, there is provided an image displaying apparatus comprising a plurality of light sources, each of which has at least one dominant emitting angle at which light having a relatively great intensity distribution is emitted, a plurality of collimating lenses, each of which includes at least one prism portion having an exit surface sloping at a prism angle corresponding to the dominant emitting angle of the respective light source, a light combining unit which transmits or reflects parallel incident light from each of the collimating lenses according to a wavelength of the parallel incident light so as to emit light along a single optical path, a display unit which processes the light incident from the light combining unit according to an input image signal to form an image, and a projection lens unit which magnifies and projects the image formed by the display unit.

BRIEF DESCRIPTION OF THE DRAWINGS

These and/or other aspects and advantages of the present invention will become apparent and more readily appreciated from the following description of the embodiments, taken in conjunction with the accompanying drawings of which.

DETAILED DESCRIPTION OF THE PREFERRED EMBODIMENTS

Figure 1:
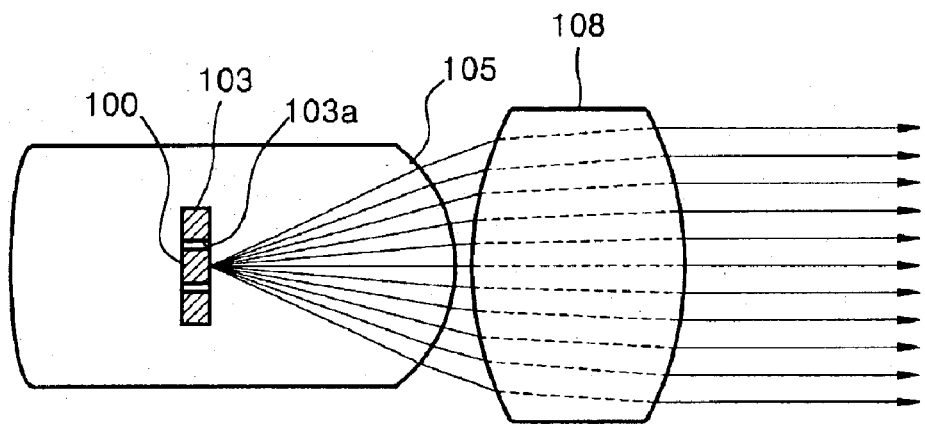
FIG. 1 is a block diagram which illustrates a conventional collimating system.
Figure 2:
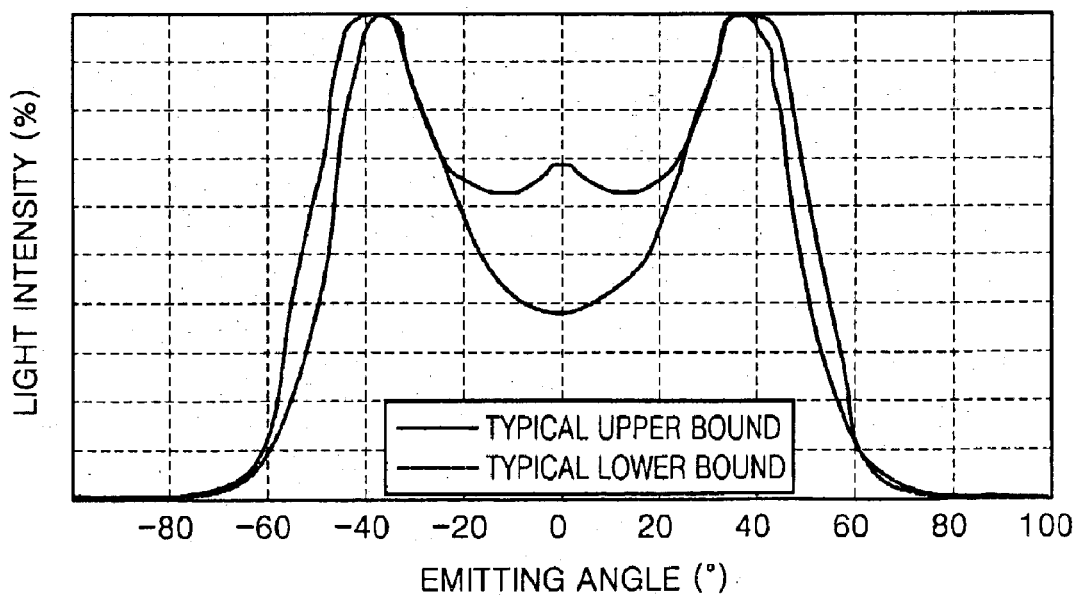
FIG. 2 is a graph of the light intensity distribution with respect to emitting angle variations in a light emitting diode.
Figure 3A:
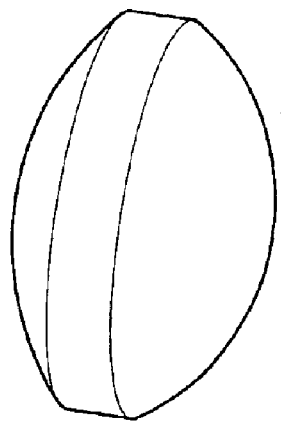
FIGS. 3A through 3D are perspective views of collimating lenses used in a conventional collimating system.
Figure 3B:
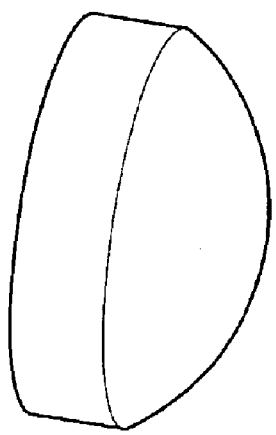
Figure 3C:
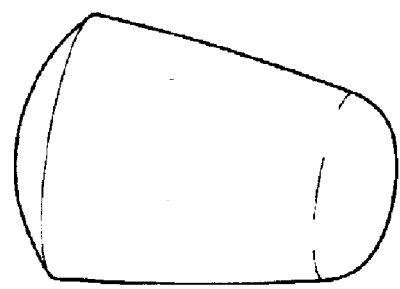
Figure 3D:
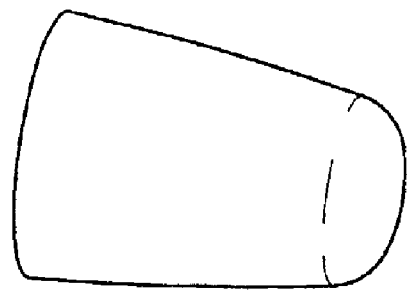
Figure 4A:
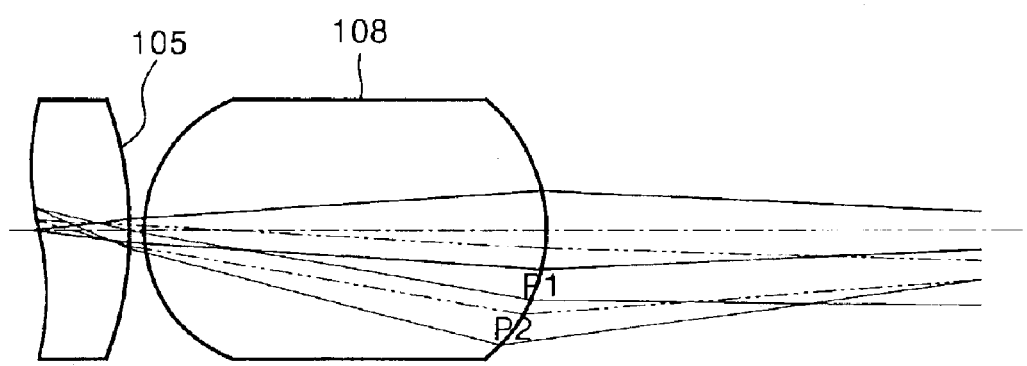
FIGS. 4A and 4B are views illustrating an operation of a conventional collimating system.
Figure 4B:
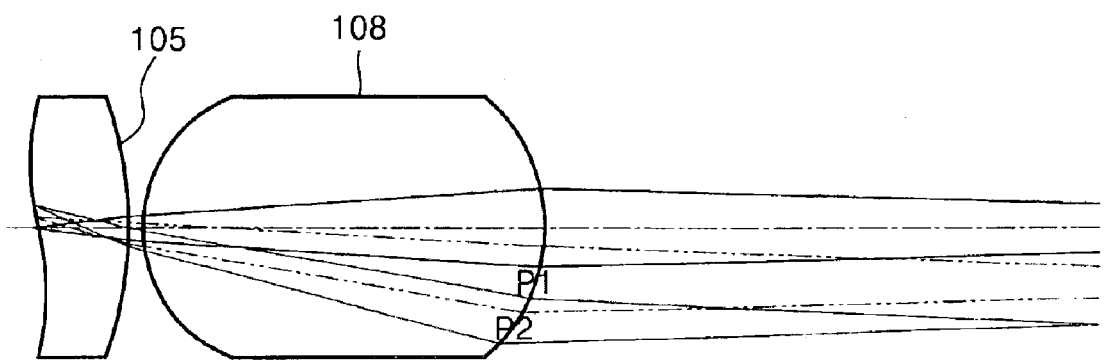

Reference will now be made in detail to the embodiments of the present invention, examples of which are illustrated in the accompanying drawings, wherein like reference numerals refer to the like elements throughout. The embodiments are described below in order to explain the present invention by referring to the figures.

Figure 5:
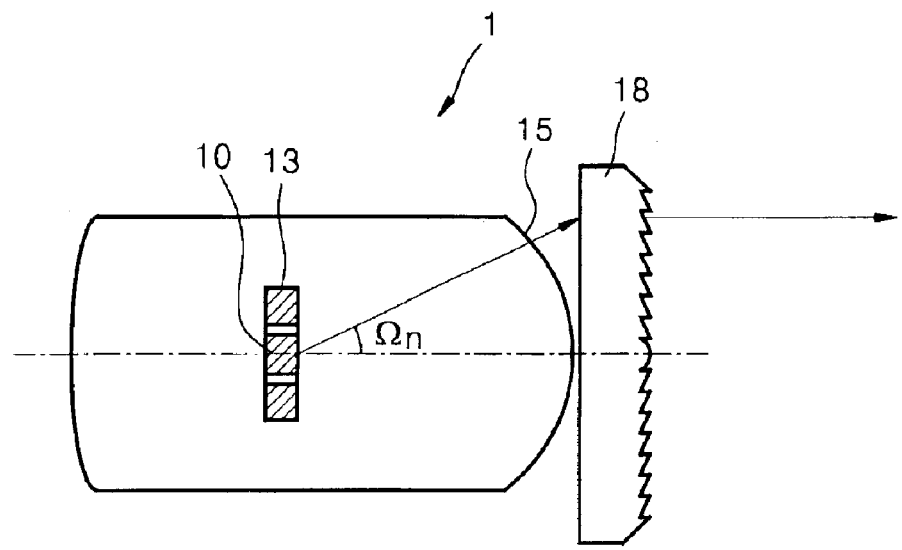
FIG. 5 illustrates a collimating system according to an embodiment of the present invention.

FIG. 5 shows a collimating system according to an embodiment of the present invention. The collimating system includes a light source 1 with a directivity and a collimating lens 18 having a prism portion which collimates light emitted from the light source 1. The light source 1 has at least one dominant emitting angle $\Omega n$ at which a light intensity distribution is relatively greater than the light intensity distribution at other emitting angles. The emission of light at a dominant emitting angle $\Omega_n$ is referred to as the directivity of a light source. For example, the light source 1, which is a light emitting diode (LED), may include a chip 10 which emits light, a die 13 which supports the chip 10, and a dome 15 having a curved surface which converges diverging light emitted from the chip 10.

Figure 6:
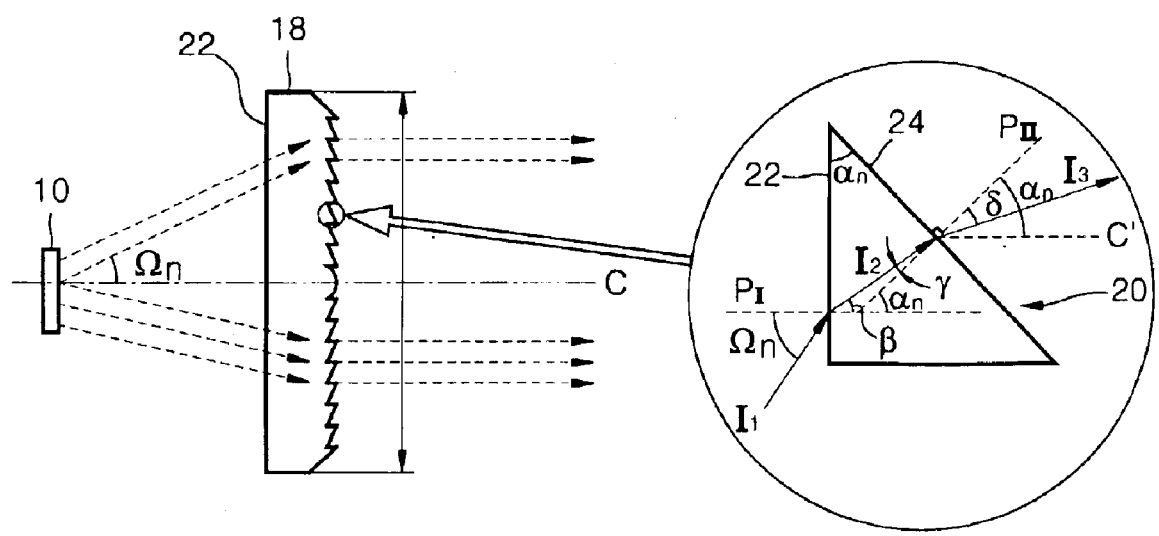
FIG. 6 is a detailed view of a collimating lens used in the collimating system of FIG. 5.

FIG. 6 shows a detailed view of the collimating lens 18 to establish structural conditions of the prism portion 20 of the collimating lens 18, which converges the incident light emitted at the dominant emitting angle $\Omega_n$ from the light source 1. The prism portion 20 includes a light entrance surface 22 and a light exit surface 24. The entrance surface 22 of the prism portion 20 is optically identical to a surface of the collimating lens 18 to which light enters. The dominant emitting angle $\Omega_n$ at which greater intensity light is emitted from the light source 1 corresponds to the angle at which the light enters the collimating lens 18.

In FIG. 6, an arrow $I_1$ denotes light entering the entrance surface 22, an arrow $I_2$ denotes light being refracted in the prism portion 20, and an arrow $I_3$ denotes light passing through the exit surface 24. Additionally, C denotes the optical axis of the collimating system, C' denotes a parallel line with respect to the optical axis C, $P_I$ denotes a normal line with respect to the entrance surface 22, and $P_{II}$ denotes a normal line with respect to the exit surface 24. Angle β denotes a refraction angle of light with respect to the entrance surface 22, angle γ denotes the angle at which light enters the exit surface 24, and angle δ denotes a refraction angle of light with respect to the exit surface 24. Also, angle $\alpha_n$ denotes the prism angle of the prism portion 20, which corresponds to the dominant emitting angle $\Omega_n$ and satisfies the relation of $\alpha_n=(\beta+\gamma)$. Denoting the refractive index of the prism portion 20 as n, the following relationship is established according to the Snell's law.

$$n \sin \beta = \sin \Omega_n \; n \sin \gamma = \sin \delta \quad (1)$$

The prism angle $\alpha_n$, at which the light $I_1$ incident on the prism portion 20 at the dominant emitting angle $\Omega_n$ is emitted parallel to the optical axis, is determined based on the equation (2) as follows. To emit parallel light through the prism portion 20, the relation of $\delta=\alpha_n$ should be satisfied. The requirements for emitting the parallel light through the prism portion 20 can be summarized as follows.

$$\alpha_n=\beta+\gamma \; \alpha_n=\delta \quad (2)$$

The following equation (3) can be derived from the equations (1) and (2) above.

$$\begin{aligned}\sin\delta &= n\sin\gamma \\ &= n\sin(\alpha_n - \beta) \\ &= n\sin\alpha_n\cos\beta - n\cos\alpha_n\sin\beta\end{aligned} \quad (3)$$

By substituting $(1-\sin^2 \beta)^{1/2}$ for $\cos \beta$ in the equation (3) and using the equations (1) and (2), the equation (3) can be rearranged as follows.

$$\begin{aligned}\sin\delta &= \sin\alpha_n\sqrt{n^2(1-\sin^2\beta)} - n\cos\alpha_n\sin\beta \\ &= \sin\alpha_n\sqrt{n^2 - \sin^2\Omega_n} - \sin\Omega_n\cos\alpha_n\end{aligned} \quad (4)$$

Equation (4) can be rearranged as follows by substituting $\alpha_n$ for δ based on the relationship of $\alpha_n=\delta$.

$$\sin \alpha_n = \sin \alpha_n \sqrt{n^2-\sin^2\Omega_n} - \sin \Omega_n \cos \alpha_n \quad (5)$$

The following equation (6) is obtained by dividing both sides of the equation (5) by $\cos \alpha_n$.

$$\tan(\alpha_n) = \tan \alpha_n \sqrt{n^2-\sin^2\Omega_n} - \sin \Omega_n \quad (6)$$

The following equation (7) is obtained by rearranging the equation (6) for the prism angle $\alpha_n$.

$$\tan\alpha_n = \frac{\sin\Omega_n}{\sqrt{n^2 - \sin^2\Omega_n} - 1} \qquad (7)$$

The prism angle $\alpha_n$, at which the light incident on the prism portion 20 having the refractive index n is emitted parallel to the optical axis C, can be calculated using the equation (7) above.

Figure 7:
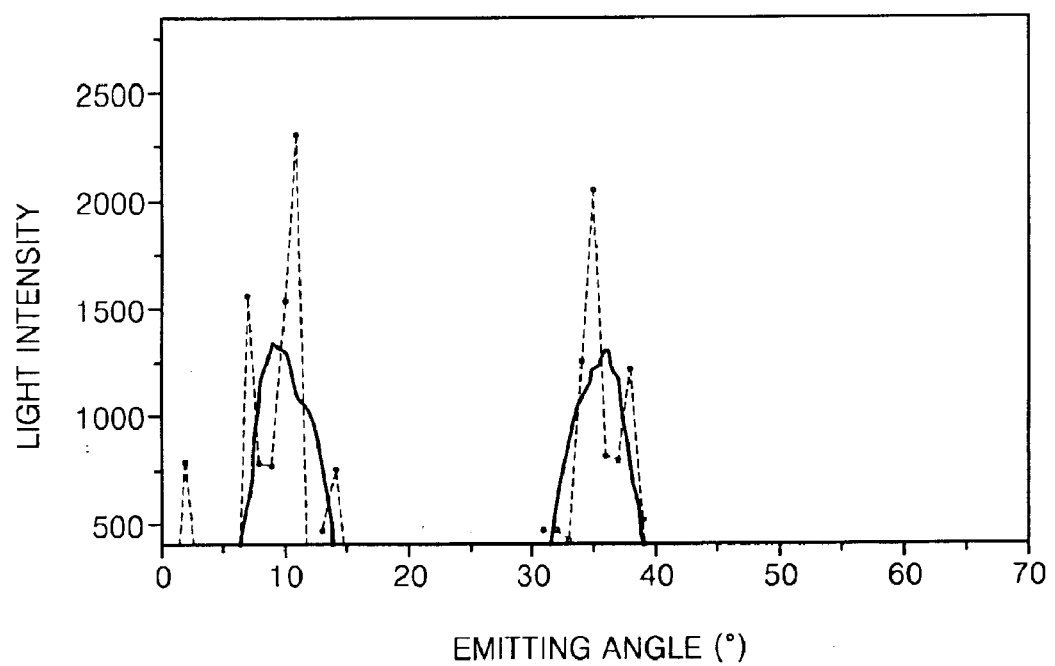
FIG. 7 is a graph of the light intensity distribution with respect to various emitting angles of a light emitting diode used in the collimating system according to the present invention.

The collimating lens 18 having the prism portion 20 is effective where a light source has at least one dominant emitting angle at which relatively great intensity light is emitted. As an example, FIG. 7 shows the light intensity distribution in an LED chip at various emitting angles. The LED chip emits light having a peak intensity distribution at the emitting angles of 10° and 38°. In FIG. 7, the points connected with one another by the dashed line are experimental data, and the solid line is the result of smoothening the experimental data using, for example, the Sovitzky-Golay method. As a result, the light intensity was greatest at the emitting angles of about 10° and 38°. According to the present invention, with the assumption that the dominant emitting angles of the light source are about 10° and 38°, the prism angle $\alpha_n$ at which the light incident on the prism portion 20 at those angles can be collimated is determined.

Figure 8A:
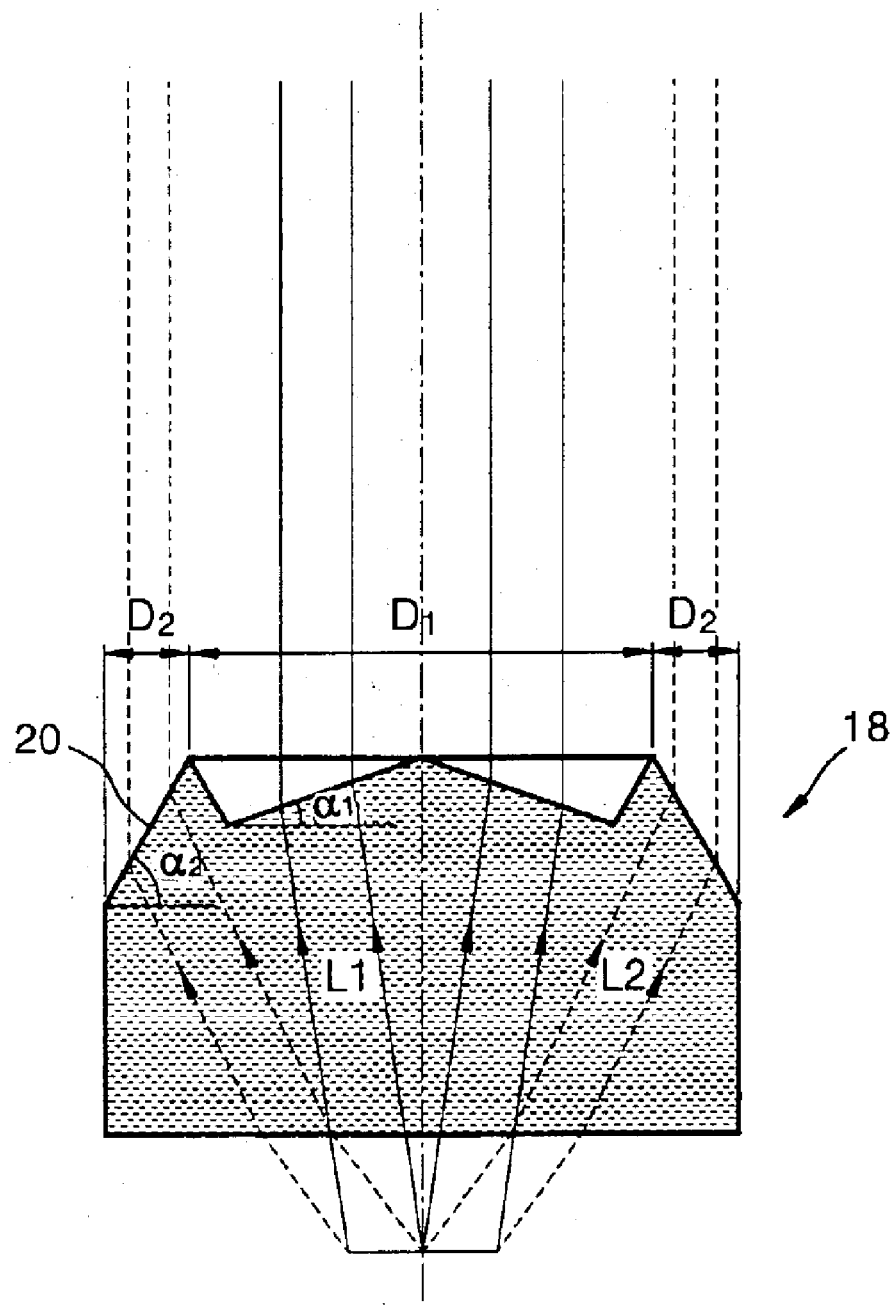
FIGS. 8A, 8B, and 9 are plane views of collimating lenses used in a collimating system according to the present invention.
Figure 8B:
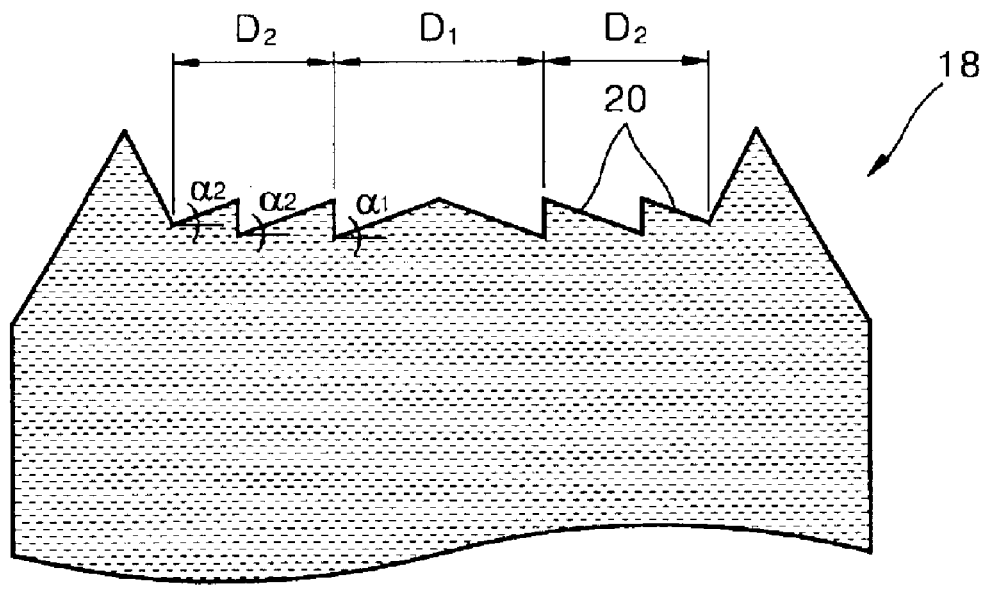
Figure 9:
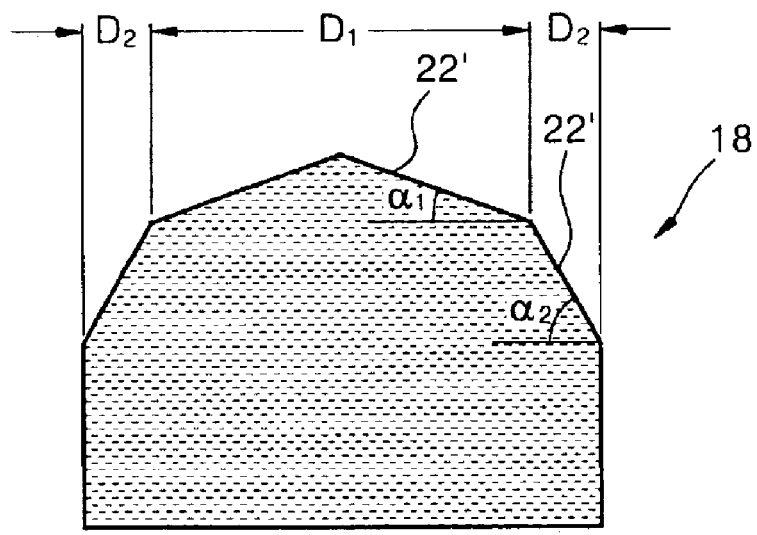

FIGS. 8A and 8B and 9 show collimating lenses according to the present invention.

Using the equation (7) and substituting 10° and 38° for the dominant emitting angle $\Omega_n$, the prism angle $\alpha_n$ is determined to be 19.7° and 59.5°, respectively, Accordingly, with reference to FIG. 8A, a prism angle $\alpha_1$ in a first region D1 to receive light L1 incident on the prism portion 20 at a dominant emitting angle of 10° is determined to be 19.7°, and a prism angle $\alpha_2$ in a second region D2 to receive light L2 incident on the prism portion 20 at a dominant emitting angle of 38° is determined to be 59.5°. By defining the prism angle $\alpha_n$ in a region of a prism position on which the light emitted from the light source 10 at the dominant emitting angle $\Omega_2$ is incident, as described above, the light concentration efficiency of the collimating system can be greatly improved.

Although in the embodiment described above, with reference to FIG. 8A, only one prism portion 20 is formed in each of the regions D1 and D2 of the collimating lens 18, a plurality of prism portions 20 can be formed in each of regions D1 and D2 of a collimating lens 18, as shown in FIG. 8B. In this case, the prism portions 20 within the same region may have an equal prism angle $\alpha_n$. The plurality of prism portions 20 may be concentrically formed. As a result, diverging light emitted from a light source at a dominant emitting angle can be efficiently condensed.

On the other hand, a collimating lens 18 can be constructed as a polygonal lens where first and second regions D1 and D2 of a prism portion have a continuous exit surface 22', as shown in FIG. 9. In this case, due to the continuity of the exit surface 22', it is unlikely that light emitting from the collimating lens 18 diverges in different directions at a boundary between the first and second regions D1 and D2.

Figure 10:
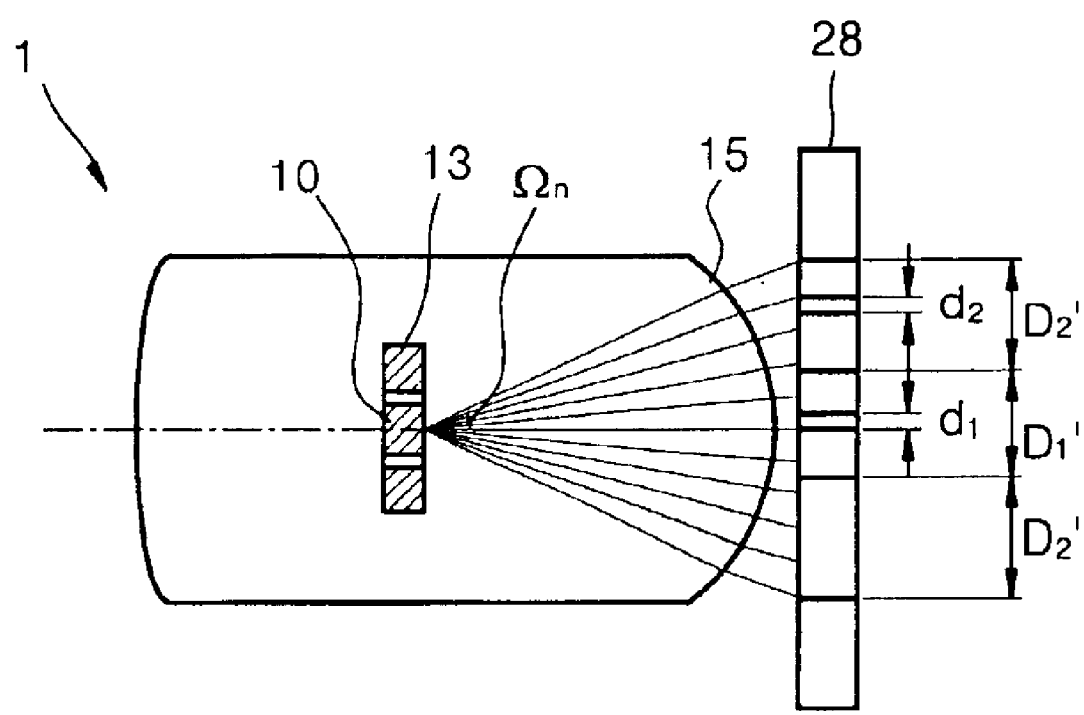
FIG. 10 illustrates a collimating system according to another embodiment of the present invention.

FIG. 10 shows a collimating system according another embodiment to the present invention. Referring to FIG. 10, the collimating system includes a light source 1 having at least one dominant emitting angle $\Omega_n$ at which light having a relatively great light intensity distribution is emitted, and a diffracting optical element 28 which collimates the light incident thereon at the dominant emitting angle $\Omega_n$. In FIG. 10, elements denoted by the same reference numerals as those in FIG. 5 are identical to those elements in FIG. 5. The light source 1 has the directivity of emitting relatively great intensity light at the at least one dominant emitting angle $\Omega_n$. The diffracting optical element 28 is designed to have a grating spacing $d_n$, defined by the following equation (8), in a region on which the light emitted from the light source 10 at the dominant emitting angle $\Omega_n$ is incident:

$$d_n = \frac{m\lambda}{\sin\Omega_n} \qquad (8)$$

where m is a natural number and $\lambda$ is the wavelength of the incident light. For example, where the wavelength $\lambda$ of the incident light is 530 nm, and the dominant emitting angles $\Omega_n$ of the light source 10 are 10° and 38°, the diffracting optical element 28 has a first region D1' on which the light emitted from the light source 10 at a dominant emitting angle 10° is incident and a second region D2' on which the light emitted from the light source 10 at a dominant emitting angle 28° is incident. The first region D1' is designed to have a grating spacing $d_1$ of, for example, 3 $\mu$m, and the second region D2' is designed to have a grating spacing $d_2$ of, for example, 0.86 $\mu$m. In this manner, the light concentration efficiency of the collimating system can be improved using the diffracting optical element 28 including multiple sectional regions, each of which has a grating spacing to receive the light emitted from the light source 10 at a dominant emitting angle.

Figure 11:
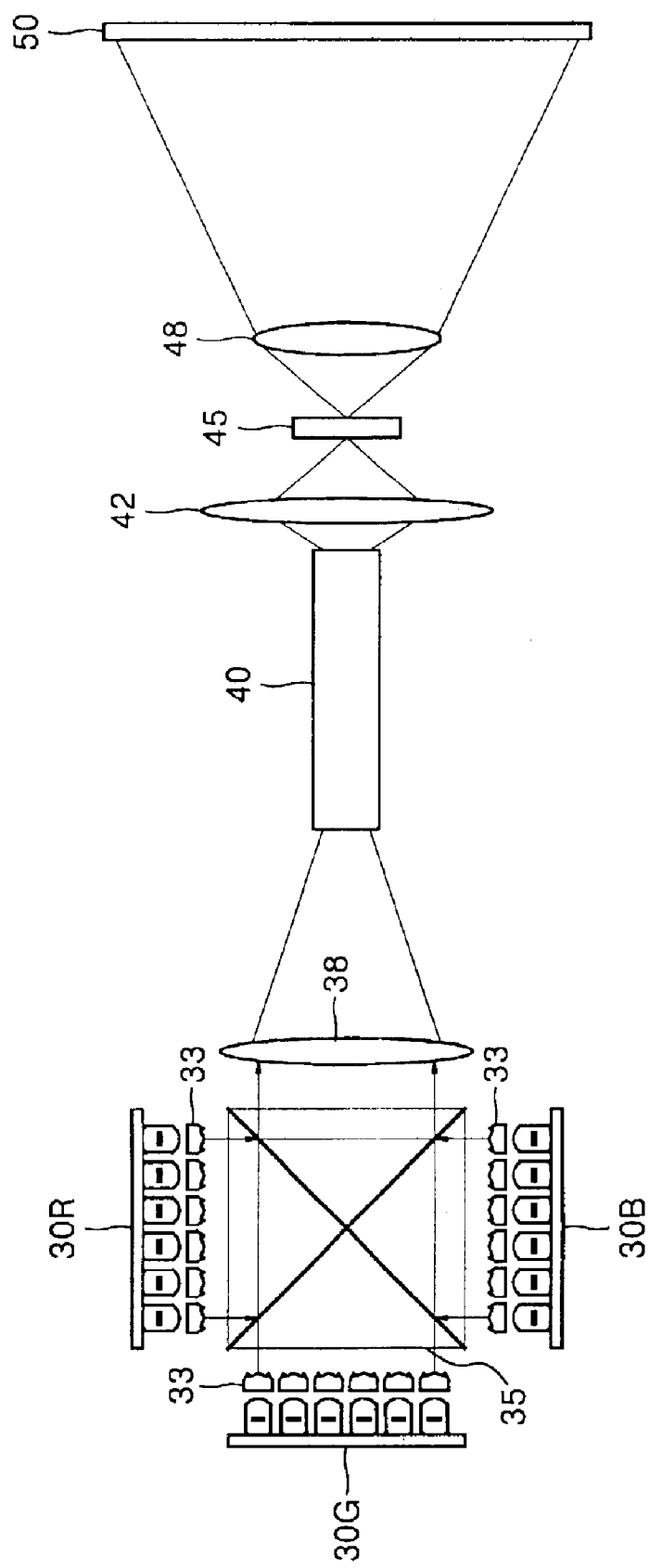
FIG. 11 illustrates a projection type image displaying apparatus having a collimating system of the present invention.

FIG. 11 shows a projection type image displaying apparatus having a collimating system of the present invention. Referring to FIG. 11, the projection type image displaying apparatus includes first, second, and third light sources 30R, 30G, and 30B which emit, for example, different wavelengths of light, a plurality of collimating lenses 33 which collimate the light incident from the first, second, and third light sources 30R, 30G, and 30B, respectively, a light combining unit 35 which combines the light from the plurality of collimating lenses 33 to emit light along a single optical path, a display unit 45 which processes the light incident thereon from the light combining unit 35 along the single optical path, according to an input image signal, and displays an image, and a projection lens unit 48 which magnifies and projects the image displayed on the display unit 45 onto a screen 50.

The first, second, and third light sources 30R, 30G, and 30B emit different wavelengths of light. For example, the first light source 30R can emit red light, the second light source 30G can emit green light, and the third light source 30B can emit blue light. A light source emitting light at the at least one dominant emitting angle $\Omega_n$ (see FIG. 5), which has an intensity distribution that is relatively greater than the intensity distribution at other various emitting angles, can be used for each of the first, second, and third light sources 30R, 30G, and 30B. For example, a laser diode or a light emitting diode (LED) can be used for each of the first, second, and third light sources 30R, 30G, and 30B. On the other hand, a plurality of such light sources can be arranged in an array to provide the amount of light required for an image displaying apparatus.

Each of the collimating lenses 33 includes a prism portion 20, for example, as shown in FIG. 6, having the prism angle $\alpha_n$ corresponding to the at least one dominant emitting angle $\Omega_n$. The light emitted from each of the first, second, and third light sources 30R, 30G, and 30B at the dominant emitting angle $\Omega_n$ is collimated while passing the prism portion 20 of each of the collimating lenses 33 and goes toward the light combining unit 35.

The light of three colors R, G, and B emitted in different directions are selectively transmitted or are reflected from the light combining unit 35 according to wavelengths thereof and a travel in the same direction. The light combining unit 35 can be, for example, a dichroic mirror, an X-prism, or an X-diffracting optical element.

A light beam incident on the display unit 45 is subjected to on-off control on a pixel-by-pixel basis according to an input image signal and transmitted to the projection lens unit 48. The display unit 45 can be, for example, a movable mirror device which displays a color image by the on-off switching operation of micro-mirrors according to an image signal, or a liquid crystal display (LCD) which displays a color image by polarizing the incident beam.

A light uniformizer 40 may be further arranged on an optical path between the light combining unit 35 and the display unit 45 so as to provide a uniform beam intensity. The light uniformizer 40 can be, for example, an integrating rod or a fly eye lens. The image displaying apparatus may further include a first relay lens 38 which converges the beam emitted from the light combining unit 35 toward the light uniformizer 40 and a second relay lens 42 which converges the beam emitted from the light uniformizer 40 toward the display unit 45.

The light collimated by each of the collimating lenses 33 and incident on the light combining unit 35 is combined to travel along a single optical path, and enters the display unit 45 with a uniform light intensity distribution via the first relay lens 38, the light uniformizer 40, and the second relay lens 42. A color image is formed by an on-off switching on a pixel-by-pixel basis according to an image signal in the display unit 45. The resulting color image is magnified and projected onto the screen 50 by the projection lens unit 48.

As described above, a collimating lens and a collimating system according to the present invention collimate light emitted at an at least one dominant emitting angle from a light source, through its prism portion whose prism angle is designed to correspond to the dominant emitting angle of the light source. Accordingly, the present collimating lens and the collimating system enhance a light concentration efficiency. The collimating lens and the collimating system can effectively increase the light concentration efficiency where the light source emits a widely diverging light.

Where a collimating system of the present invention is applied to a projection type image displaying apparatus, widely diverging light emitted from a light source is condensed at a high efficiency and transmitted to a projection optical system. Accordingly, power consumption can be reduced. In addition, a discharge lamp, which is frequently used as a light source in conventional color image displaying apparatuses, can be replaced by an LED, so that high quality color image displaying apparatuses can be lit up immediately and used for a longer period of time.

Although a few embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A collimating system comprising:
   a light source having at least one dominant emitting angle at which light having a light intensity distribution, which is relatively greater than a light intensity distribution at other various emitting angles, is emitted; and
   a collimating lens including at least one prism portion having an exit surface sloping at a prism angle corresponding to the dominant emitting angle, wherein the at least one prism portion satisfies the following relationship:

$$\tan\alpha_n = \frac{\sin\Omega_n}{\sqrt{n^2 - \sin^2\Omega_n} - 1}$$

where $\alpha_n$ denotes the prism angle of the prism portion, $\Omega_n$ denotes the dominant emitting angle of the light source, and n is a refractive index of the collimating lens.

2. The collimating system of claim 1, wherein the at least one prism portion is concentrically formed in the collimating lens.

3. The collimating system of claim 2, wherein the light source is a light emitting diode or a laser diode.

4. The collimating system of claim 3, wherein the light source has an array structure.

5. The collimating system of claim 1, wherein the collimating lens is a polygonal lens having a continuous exit surface.

6. An image displaying apparatus comprising:
   a plurality of light sources, each of which has at least one dominant emitting angle at which light having a light intensity distribution, which is relatively greater than a light intensity distribution at other various emitting angles, is emitted;
   a plurality of collimating lenses, each of which includes at least one prism portion having an exit surface sloping at a prism angle corresponding to the dominant emitting angle of the respective light source;
   a light combining unit which transmits or reflects parallel incident light from each of the collimating lenses according to a wavelength of the parallel incident light so as to emit light along a single optical path;
   a display unit which processes the light incident from the light combining unit according to an input image signal to form an image; and
   a projection lens unit which magnifies and projects the image formed by the display unit.

7. The image displaying apparatus of claim 6, wherein the at least one prism portion satisfies the following relationship:

$$\tan\alpha_n = \frac{\sin\Omega_n}{\sqrt{n^2 - \sin^2\Omega_n} - 1}$$

where $\alpha_n$ denotes the prism angle of the prism portion, $\Omega_n$ denotes the dominant emitting angle of the light source, and n is a refractive index of the collimating lens.

8. The image displaying apparatus of claim 7, wherein the at least one prism portion is concentrically formed in each of the collimating lenses.

9. The image displaying apparatus of claim 8, wherein the plurality of light sources are light emitting diodes or laser diodes.

10. The image displaying apparatus of claim 7, wherein the plurality of light sources have an array structure.

11. The image displaying apparatus of claim 7, wherein the plurality of collimating lenses are polygonal lenses each of which has a continuous exit surface.

12. The image displaying apparatus of claim 7, wherein the light combining unit is a dichroic mirror, an X-prism, or an X-type diffracting optical element.

13. The image displaying apparatus of claim 12, further comprising a light uniformizer which is provided on an optical path between the light combining unit and the display unit, and provides a uniform beam intensity of the light incident from the light combining unit.

14. The image displaying apparatus of claim 6, wherein the light combining unit is a dichroic mirror, an X-prism, or an X-type diffracting optical element.

15. A collimating lens collimating light emitted from a light source having at least one dominant emitting angle at which light having a light intensity distribution, which is relatively greater than a light intensity distribution at other various emitting angles, is emitted, the collimating lens comprising at least one prism portion having an exit surface sloping at a prism angle corresponding to the dominant emitting angle of the light source, wherein the at least one prism portion satisfies the following relationship:

$$\tan\alpha_n = \frac{\sin\Omega_n}{\sqrt{n^2 - \sin^2\Omega_n} - 1}$$

where $\alpha_n$ denotes the prism angle of the prism portion, $\Omega_n$ denotes the dominant emitting angle of the light source, and n is a refractive index of the collimating lens.

16. The collimating lens of claim 15, wherein the at least one prism portion is concentrically formed in the collimating lens.

17. The collimating lens of claim 15, wherein the collimating lens is a polygonal lens having a continuous exit surface.

18. The image displaying apparatus of claim 6, wherein the light sources emit lights having different wavelengths.

19. The image displaying apparatus of claim 6, wherein the display unit is a moveable mirror device or a liquid crystal display (LCD).

20. The image displaying apparatus of claim 13, further comprising:
    a first relay lens which converges the light incident from the light combining unit toward the light uniformizer; and
    a second relay lens which converges the uniform beam intensity of the light toward the display unit.

21. The image displaying apparatus of claim 13, wherein the light uniformizer is an integrating rod or a fly eye lens.

22. The collimating system of claim 1, further comprising a light combining unit; and
    wherein the light combining unit transmits or reflects parallel light according to wavelengths of the parallel light.

* * * * *

UNITED STATES PATENT AND TRADEMARK OFFICE
CERTIFICATE OF CORRECTION

PATENT NO. : 6,927,919 B2
DATED : August 9, 2005
INVENTOR(S) : Ju-seong Hwang

It is certified that error appears in the above-identified patent and that said Letters Patent is hereby corrected as shown below:

<u>Column 8,</u>
Line 58, change "claim 7" to -- claim 9 --.

Signed and Sealed this

Fourth Day of April, 2006

JON W. DUDAS
*Director of the United States Patent and Trademark Office*